(Model.)

C. G. W. PURDY.
MACHINE FOR FELTING HAT BODIES

No. 281,134. Patented July 10, 1883.

WITNESSES:
Chas. Nida.
C. Sedgwick.

INVENTOR:
C. G. W. Purdy
BY Munn & Co.
ATTORNEYS.

N. PETERS, Photo-Lithographer, Washington, D. C.

UNITED STATES PATENT OFFICE.

CHARLES G. W. PURDY, OF BROOKLYN, NEW YORK.

MACHINE FOR FELTING HAT-BODIES.

SPECIFICATION forming part of Letters Patent No. 281,134, dated July 10, 1883.

Application filed May 17, 1883. (Model.)

*To all whom it may concern:*

Be it known that I, CHARLES G. W. PURDY, of Brooklyn, in the county of Kings and State of New York, have invented a new and useful Improvement in Machines for Felting Hat-Bodies, of which the following is a full, clear, and exact description.

Reference is to be had to the accompanying drawings, forming a part of this specification, in which similar letters of reference indicate corresponding parts in all the figures.

Figure 1:
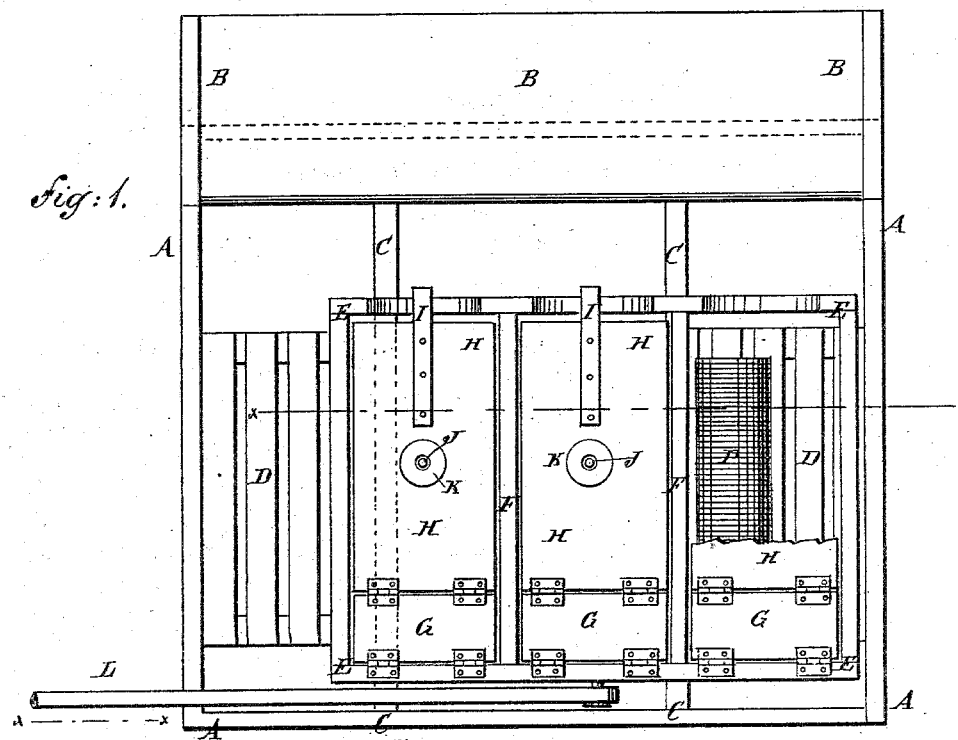
Figure 2:
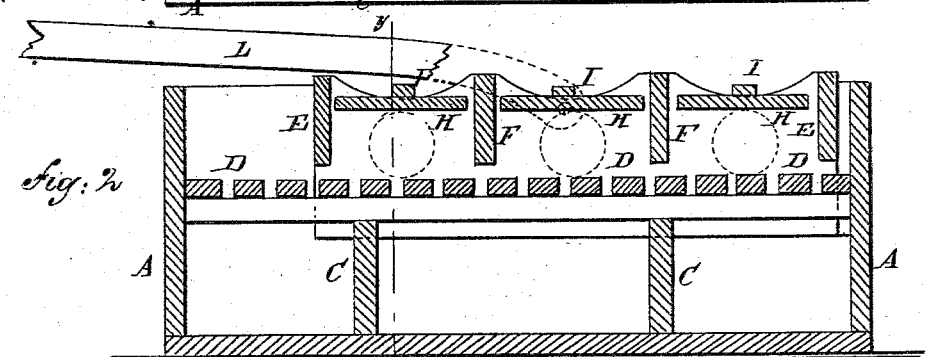
Figure 3:
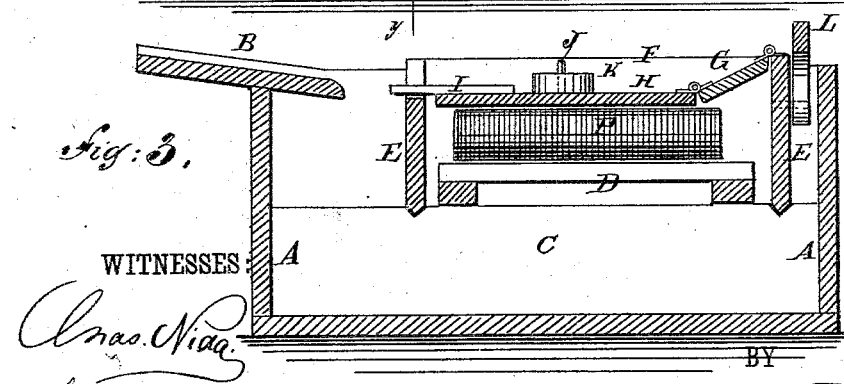
Figure 4:
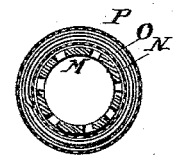

Figure 1 is a plan view of my improvement, part being broken away. Fig. 2 is a sectional rear elevation of the same, taken through the line $x\ x$, Fig. 1. Fig. 3 is a sectional side elevation of the same, taken through the line $y\ y$, Fig. 2. Fig. 4 is a sectional end elevation of a roll of hat-bodies.

The object of this invention is to improve the quality of felted hat-bodies and lessen the amount of loss from damaged bodies.

A represents a vat or box of suitable size, and which is designed to be filled with hot water, and has an inclined table, B, attached to the upper edge of its forward side, for convenience in rolling, unrolling, and rerolling the hat-bodies.

To the sides of the vat A, and to bars or partitions C, attached to the said vat, is secured a platform, D, which is formed of slats placed at a little distance apart, or is slotted to allow the liquid in the vat to circulate through the said platform freely.

E is a box or carriage, which is made a little wider than the width of the platform D, so that the edges of its downwardly-projecting front and rear sides may rest in recesses in the bars or partitions C, or upon wheels or rollers pivoted to the said bars or partitions, or to supports attached to them. The carriage E is made shorter than the width of the vat A, so that the said carriage can have a longitudinal movement within the said vat. The carriage E is divided into three (more or less) compartments by cross-partitions F, each compartment being made large enough to receive a roll of hat-bodies and allow the said roll to have the necessary freedom of movement.

To the upper edge of the rear side of the carriage E, opposite the end of each compartment, is hinged the rear end of the rear part, G, of the cover, the forward end of which is hinged to the rear end of the forward part, H, of the said cover. The cover G H is made of such a size as to fit loosely into the compartment, and to its forward part is attached an arm, I, which rests upon the concaved upper edge of the forward side of the carriage E, to prevent the said end of the cover from dropping too low in its compartment, and to serve as a handle for opening and closing the said cover. Each cover G H is provided with a pin, J, to receive weights K, to hold the said cover down with any desired pressure. With this construction the joints of the covers G H allow the said covers to adjust themselves to rolls of hat-bodies, whether the said rolls be cylindrical or tapered.

To the center of the rear side of the carriage E is pivoted the end of a pitman, L, the other end of which projects beyond the side of the vat A, to serve as a handle for vibrating the said carriage E. If desired, the pitman L can be connected with and operated by a steam-engine or other convenient motor.

M is a hollow cylinder, of rubber or other suitable flexible and elastic material, which should be made slightly larger in the center than at the ends, and of such a size and length that the roll of hat-bodies formed upon it will fit loosely into a compartment of the carriage E. The hollow cylinder M is perforated with numerous holes to allow the liquid to pass through it freely. The hollow cylinder M is covered with a linen cloth, N, to keep the hat-bodies O rolled around the said cylinder from coming in contact with the rubber, and the roll of hat-bodies O is then covered with a sizing-cloth, P, in the ordinary manner. With this construction the hat-bodies can be wrapped smoothly around the rubber cylinder M, so that they will have no wrinkles or folds to interfere with their proper felting.

In using the machine the rolls of hat-bodies, formed as hereinbefore described, are placed in the compartments of the carriage E, the covers G H are turned down upon them, and power is applied to the pitman L, to vibrate the said carriage. As the carriage is vibrated the rolls of hat-bodies will be rolled back and forth upon the slotted platform D while being pressed down upon the said platform by the weighted covers G H, so that the movement of the said rolls will be very similar to their movement in hand-felting. With this construction a much finer quality of felting will be produced than is possible with other felting-machines or by hand-felting.

Having thus described my invention, I claim as new and desire to secure by Letters Patent—

1. A machine for felting hat-bodies, constructed substantially as herein shown and described, and consisting of the vat A, having table B, bars C, and slotted platform D, and the vibrating carriage E, having partitions F, and provided with jointed covers G H and pitman L, as set forth.

2. In a machine for felting hat-bodies, the combination, with the vat A and slotted platform D, of the vibrating carriage E, having partitions F and jointed covers G H, substantially as herein shown and described, whereby rolls of hat-bodies can be rolled back and forth upon the said platform, while under pressure, by the vibration of the said carriage, as set forth.

3. In a machine for felting hat-bodies, the combination, with a hot-water tank, rolls to carry the hat-bodies, and a weighted cover, of a slotted platform, D, on which the hat-bodies are rolled, said platform being raised above the bottom of tank and supported on partitions C, as shown and described.

4. The carriage E of a machine for felting hat-bodies, divided by partitions F, to form a series of separate compartments, one for each roll, as shown and described.

5. The carriage-cover of a machine for felting hat-bodies, formed of the part G, hinged to one side of the carriage, and a part, H, hinged to part G, the part H carrying on the upper side a pin, J, at or near the middle, and an arm, I, adapted to rest upon the concaved upper edge of one side of the carriage, as shown and described.

6. A roll for carrying the hat-body and cloths N P, consisting of the perforated, hollow, flexible, and elastic cylinder M, made of a diameter decreasing from the middle toward each end, as shown and described.

CHARLES G. W. PURDY.

Witnesses:
JAMES T. GRAHAM,
C. SEDGWICK.